United States Patent
Fukui et al.

(10) Patent No.: US 12,176,118 B2
(45) Date of Patent: Dec. 24, 2024

(54) ORGANIC IODINE TRAPPING APPARATUS

(71) Applicant: Hitachi-GE Nuclear Energy, Ltd., Ibaraki (JP)

(72) Inventors: Sohei Fukui, Tokyo (JP); Kazushige Ishida, Tokyo (JP); Kazuo Tominaga, Ibaraki (JP); Motoi Tanaka, Ibaraki (JP); Tomoharu Hashimoto, Ibaraki (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 1017 days.

(21) Appl. No.: 17/223,078

(22) Filed: Apr. 6, 2021

(65) Prior Publication Data
US 2021/0316248 A1 Oct. 14, 2021

(30) Foreign Application Priority Data
Apr. 10, 2020 (JP) ................. 2020-071039

(51) Int. Cl.
*G21F 9/02* (2006.01)
*B01D 53/14* (2006.01)
(Continued)

(52) U.S. Cl.
CPC ........... *G21F 9/02* (2013.01); *B01D 53/1487* (2013.01); *B01D 53/185* (2013.01); *B01D 53/70* (2013.01); *B01D 53/78* (2013.01); *B01D 53/79* (2013.01); *G21C 9/004* (2013.01); *G21C 13/10* (2013.01); *G21F 9/12* (2013.01);
(Continued)

(58) Field of Classification Search
None
See application file for complete search history.

(56) References Cited

U.S. PATENT DOCUMENTS

2014/0010340 A1  1/2014  Nilsson

FOREIGN PATENT DOCUMENTS

DE   33 47 118 A1    7/1985
DE    3644179 A1 *   7/1988
(Continued)

OTHER PUBLICATIONS

Extended European Search Report received in corresponding European Application No. 21167401.5 dated Sep. 6, 2021.
(Continued)

*Primary Examiner* — Jennifer A Leung
(74) *Attorney, Agent, or Firm* — MATTINGLY & MALUR, PC (57) ABSTRACT

There is provided an organic iodine trapping apparatus that can efficiently trap an organic iodine without using complicated or large equipment. An organic iodine trapping apparatus 30 is an apparatus that traps an organic iodine, including: a trapping vessel 1 through which gas containing an organic iodine is passed; an organic iodine remover 2 (Example: trihexyl (tetradecyl) phosphonium chloride, or the like) that is disposed in or injected into the trapping vessel 1 and decomposes the organic iodine; and a trapping material 3 that is disposed in or injected into the trapping vessel 1 and traps iodine ions generated by decomposition of the organic iodine, in which the trapping material 3 is a metal (Example: silver or the like) or a metal compound (Example: silver chloride, silver oxide, or the like).

12 Claims, 4 Drawing Sheets

(51) Int. Cl.
  *B01D 53/18* (2006.01)
  *B01D 53/70* (2006.01)
  *B01D 53/78* (2006.01)
  *B01D 53/79* (2006.01)
  *G21C 9/004* (2006.01)
  *G21C 13/10* (2006.01)
  *G21F 9/12* (2006.01)

(52) U.S. Cl.
  CPC .. *B01D 2252/103* (2013.01); *B01D 2252/504* (2013.01); *B01D 2257/2068* (2013.01)

(56) References Cited

FOREIGN PATENT DOCUMENTS

| | | | |
|---|---|---|---|
| JP | S63-12345 A | | 1/1988 |
| JP | 07-209488 A | | 8/1995 |
| JP | 2014232033 A | * | 12/2014 |
| JP | 2015-522161 A | | 8/2015 |
| JP | 2016186427 A | * | 10/2016 |
| JP | 2016-206164 A | | 12/2016 |
| JP | 2017223535 A | * | 12/2017 |
| JP | 2020-8517 A | | 1/2020 |
| KR | 101523312 B1 | * | 5/2015 |
| WO | WO-2020012912 A1 | * | 1/2020 |

OTHER PUBLICATIONS

Japanese Office Action received in corresponding Japanese Application No. 2020-071039 dated Aug. 22, 2023.

* cited by examiner

ORGANIC IODINE TRAPPING APPARATUS

CROSS-REFERENCE TO RELATED APPLICATION

The present application claims priority from Japanese application JP2020-071039, filed on Apr. 10, 2020, the contents of which is hereby incorporated by reference into this application.

TECHNICAL FIELD

The present invention relates to an organic iodine trapping apparatus that traps a radioactive organic iodine released from a nuclear reactor as well as an organic iodine contained in steam or the like.

BACKGROUND ART

A nuclear reactor facility is equipped with a filtered containment venting apparatus to prevent radioactive materials released from the nuclear reactor from leaking into the environment. When core damage occurs in a nuclear reactor accident and the pressure inside the container vessel rises abnormally, the container vessel is damaged and leakage is caused. Therefore, overpressure damage to the container vessel is prevented by venting the steam in the container vessel in advance. When the high-temperature and high-pressure steam is released from the nuclear reactor into the container vessel, the steam is passed through a filtered containment venting apparatus, and the major radioactive materials are removed before being released into the atmosphere.

The radioactive materials generated during a nuclear reactor accident include noble gases, aerosols, inorganic iodines, organic iodines, and the like. In the filtered containment venting apparatus, these radioactive materials, except for noble gases, are trapped in the vessel and the release thereof to the environment is suppressed. In general, the filtered containment venting apparatus retains scrubbing water, which acts as a wet type filter, in the vessel as described in JP-T-2015-522161 (PTL 1). At the upper part of the vessel, a fiber filter which is a dry type filter is embedded.

In the scrubbing water, there is a case where sodium thiosulfate or sodium hydroxide is added to the water, and the vented steam is released into the scrubbing water. Inorganic iodine (elemental iodine) or aerosols ionized by the reaction with sodium thiosulfate are dissolved and trapped in the scrubbing water. Some aerosols released from the scrubbing water into the gas phase adhere to and collide with the fiber filter and are trapped. Organic iodine, which is unlikely to be trapped in the scrubbing water or the fiber filter, is trapped by silver zeolite or activated carbon, as described in JP-A-7-209488 (PTL 2).

CITATION LIST

Patent Literature

PTL 1: JP-T-2015-522161
PTL 2: JP-A-7-209488

SUMMARY OF INVENTION

Technical Problem

The organic iodine released from the nuclear reactor is insoluble in water, including methyl iodine, and is not sufficiently trapped when being introduced into the pool water or the scrubbing water in a pressure suppression chamber during venting. There is also a case where organic iodine, such as methyl iodine, is newly generated by the reaction of elemental iodine in the exhaust process from the nuclear reactor. Therefore, there is a need for an organic iodine trapping apparatus that can efficiently trap the organic iodine released from the nuclear reactor.

Silver zeolite or activated carbon is known as a remover that removes the organic iodine (refer to Patent Literature 2). However, there is a concern that the trapping efficiency of the remover of the related art decreases in a case where a large amount of moisture adheres. Therefore, the equipment for removing the moisture is required and complicated equipment is required to be added to the filtered containment venting vessel. Since a large amount of remover of the related art is required, as described in Patent Literature 2, large equipment is required to be attached to the filtered containment venting vessel.

In this manner, in the technology of the related art, special equipment design is required, and simplification of the equipment structure or reduction of processing costs is hindered.

Therefore, an object of the present invention is to provide an organic iodine trapping apparatus that can efficiently trap the organic iodine without using complicated or large equipment.

In order to solve the above-described problems, an organic iodine trapping apparatus according to the present invention is an organic iodine trapping apparatus that traps an organic iodine, including: a trapping vessel through which gas containing an organic iodine is passed; an organic iodine remover that is disposed in or injected into the trapping vessel and decomposes the organic iodine; and a trapping material that is disposed in or injected into the trapping vessel and traps iodine ions generated by decomposition of the organic iodine, in which the trapping material is a metal or a metal compound.

Advantageous Effects of Invention

According to the present invention, it is possible to provide an organic iodine trapping apparatus that can efficiently trap an organic iodine without using complicated or large equipment.

DESCRIPTION OF EMBODIMENTS

An organic iodine trapping apparatus according to an embodiment of the present invention will be described below with reference to the drawings. In each of the following drawings, common configurations will be given the same reference numerals and the redundant description thereof will be omitted.

First Embodiment

Figure 1:
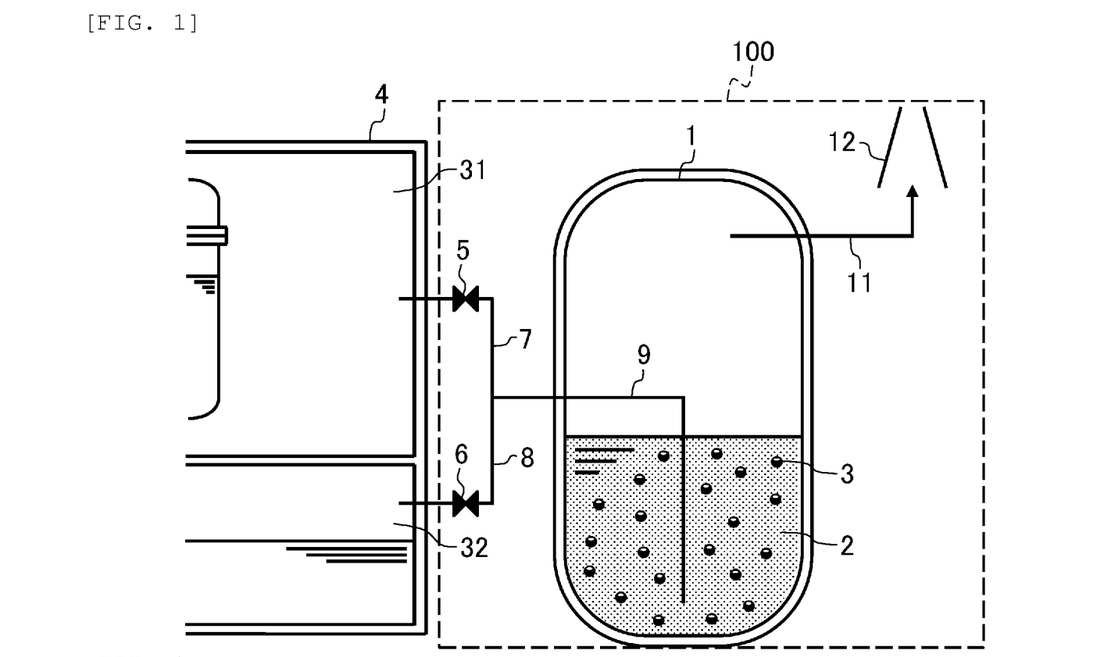
FIG. 1 is a sectional view schematically illustrating an organic iodine removing apparatus according to a first embodiment.

FIG. 1 is a sectional view schematically illustrating an organic iodine trapping apparatus according to a first embodiment.

FIG. 1 illustrates an example of the application of the present invention to a filtered containment venting apparatus that traps radioactive materials released from the inside of a nuclear reactor container vessel, as an example of the organic iodine trapping apparatus that traps an organic iodine.

As illustrated in FIG. 1, a filtered containment venting apparatus (organic iodine trapping apparatus) 100 according to the present embodiment includes a filtered containment venting vessel (trapping vessel) 1, an organic iodine remover 2, a trapping material 3, isolation valves 5 and 6, a dry well vent pipe 7, a wet well vent pipe 8, an inlet pipe 9, an outlet pipe 11, and an exhaust pipe 12.

The filtered containment venting apparatus 100 is an apparatus for removing radioactive materials in the vent gas released from a nuclear reactor container vessel 4 as much as possible. The filtered containment venting apparatus 100 is connected to the nuclear reactor container vessel 4 through a pipe.

The nuclear reactor container vessel 4 includes a dry well 31 in which a nuclear reactor pressure vessel is disposed, and a wet well 32 in which a pressure suppression pool is formed. Steam released into the dry well 31 or steam released by overpressure from the main steam system can flow into the wet well 32 through a vent pipe (not illustrated). When the high-temperature and high-pressure steam is condensed by the pool water in the wet well 32, the pressure in the nuclear reactor container vessel 4 is suppressed.

One end of the dry well vent pipe 7, which is used for venting of the dry well 31, is connected to the dry well 31. The dry well vent pipe 7 is provided with the normally closed type isolation valve 5. The other end of the dry well vent pipe 7 is connected to the inlet pipe 9.

The wet well 32 is connected to one end of the wet well vent pipe 8 used for venting of the wet well 32. The wet well vent pipe 8 is provided with the normally closed type isolation valve 6. The other end of the wet well vent pipe 8 is connected to the inlet pipe 9.

One end of the inlet pipe 9 is connected to the dry well vent pipe 7 and the wet well vent pipe 8, and the other end of the inlet pipe 9 is introduced into the inside of the filtered containment venting vessel 1. At the other end of the inlet pipe 9, a scrubber nozzle (not illustrated), for example, formed by multiple Venturi nozzles, is attached. According to the scrubber nozzle, the vent gas is injected into the liquid phase in the filtered containment venting vessel 1.

In the nuclear reactor container vessel 4, when a severe accident, such as the damage of the nuclear reactor pressure vessel, occurs, in order to prevent abnormal increases in pressure or temperature inside the nuclear reactor container vessel 4, the gas in the nuclear reactor container vessel 4 is released to the atmosphere. During the filter venting, the gas in the nuclear reactor container vessel 4 is introduced into the filtered containment venting vessel 1 through the dry well vent pipe 7 or the wet well vent pipe 8.

The filtered containment venting vessel 1 is a vessel through which the vent gas is passed, and has a function as a wet type filter. The vent gas contains aerosols of radioactive materials, inorganic iodines or organic iodines containing radioiodine, and the like. The radioactive materials in the vent gas are trapped in the filtered containment venting vessel 1 and the release thereof into the atmosphere is suppressed.

The outlet pipe 11 is connected to the filtered containment venting vessel 1. The other end of the outlet pipe 11 is connected to the exhaust pipe 12. The exhaust pipe 12 is installed outside the nuclear reactor container vessel 4 to release the vented gas, from which radioactive materials have been removed, into the atmosphere.

In the filtered containment venting vessel 1, the organic iodine remover 2 having an action of decomposing the organic iodine, and the trapping material 3 that traps iodine ions generated by the decomposition of the organic iodine, are used together. In the filtered containment venting apparatus 100 illustrated in FIG. 1, the organic iodine remover 2 and the trapping material 3 are disposed in the filtered containment venting vessel 1 even before the venting is performed. The organic iodine remover 2 is stored in the filtered containment venting vessel 1. The trapping material 3 is contained as a dispersoid in the organic iodine remover 2.

In general, when a serious accident occurs in a nuclear reactor that involves the damage of the pressure vessel, various radioactive materials are released into the container vessel along with the high-temperature and high-pressure steam caused by the evaporation of cooling water or the like. Depending on the power of the nuclear reactor or the accident scenario, it is evaluated that approximately 1 kg of radioactive organic iodine will be generated during a severe accident with fuel damage, such as the damage of the pressure vessel. It is evaluated that methyl iodine ($CH_3I$) is mainly generated as the organic iodine.

When a serious accident occurs in the nuclear reactor and the pressure or temperature in the container vessel becomes excessively high, the container vessel is damaged, and the leakage of the radioactive materials occurs. Therefore, the venting is performed to prevent abnormal increases in pressure or temperature in the container vessel. In the nuclear reactor container vessel 4 illustrated in FIG. 1, the isolation valves 5 and 6 are opened when venting becomes necessary.

When the isolation valve 5 is opened, the high-temperature and high-pressure steam in the dry well 31 flows into the filtered containment venting vessel 1 through the dry well vent pipe 7 and the inlet pipe 9. When the isolation valve 6 is opened, the high-temperature and high-pressure steam in the wet well 32 flows into the filtered containment venting vessel 1 through the wet well vent pipe 8 and the inlet pipe 9. The vent gas containing radioactive materials is passed through the organic iodine remover 2.

[Organic Iodine Remover]

As the organic iodine remover 2, a substance ($X^+$-$Y^-$) composed of cations ($X^+$) and anions ($Y^-$) is used. The organic iodine remover 2 is a substance that exhibits an action of "dissolution of the organic iodine," "decomposition of the organic iodine," and "retention of decomposed product of the organic iodine," and the organic iodine in the vent gas is trapped by these three stages of action and the trapping material 3.

As expressed in the following expression (1), according to the organic iodine remover ($X^+$-$Y^-$), the organic iodine (RI) can be decomposed into iodide ions ($I^-$). Iodine ion ($I^-$) is more stable in the liquid phase compared to the organic iodine (RI), and is retained stable by the cation ($X^+$). Therefore, the leakage of radioactive organic iodine to the environment can be reliably prevented.

$$X^+ - Y^- + RI \rightarrow X^+ - Y^- + I^- + R^+ \qquad (1)$$

It is preferable that the organic iodine remover 2 shows non-volatility, which means that volatilization is not substantially performed at temperatures lower than approximately 160° C. When a nuclear reactor accident occurs, venting of steam at high temperatures of approximately 100 to 160° C. is expected. When the organic iodine remover 2 is non-volatile, volatilization of the organic iodine remover 2 itself or the trapping material 3 can be avoided even when high-temperature and high-pressure vent gas is introduced. The volatility temperature of the organic iodine remover 2 is preferably 200° C. or higher.

The organic iodine remover 2 may be either liquid or solid at ambient temperature. However, from the viewpoint of increasing the trapping efficiency of the organic iodine, it is preferable that the organic iodine remover 2 is liquid at the ambient temperature during venting.

For example, substances classified into ambient temperature molten salt, ionic liquid, interfacial active agent, quaternary salt, and phase transfer catalyst can be used as the organic iodine remover 2. One or more types of cations may be used as the cation of the organic iodine remover 2. One or more types of anions may be used as the anion of the organic iodine remover 2.

As the organic iodine remover 2, for example, a substance that has a structure in which cations and anions are dissociated from each other and is composed of a cation molecule with a cation in the molecule thereof and an anion molecule with an anion in the molecule thereof, can be used. When using such ionic substances, the properties of the organic iodine remover 2 can be controlled relatively easily by the combination of molecules.

Zwitterionic molecules, in which the cation and anion are chemically bonded to each other and which is composed of a single molecule, can also be used as the organic iodine remover 2. Using such a zwitterionic molecule, it is possible to relatively easily obtain the organic iodine remover 2 which is solid at ambient temperature. The organic iodine remover 2, which is solid at ambient temperature, may be advantageous in storage and handling.

Cations that make up the organic iodine remover 2 include ammonium, phosphonium, sulfonium, pyrrolidinium, piperidinium, morpholinium, and the like. As the cation that makes up the organic iodine remover 2, an organic cation in which an organic group is bonded to phosphorus atom (P), nitrogen atom (N), or sulfur atom (S), which are the central atoms, is preferable. The organic group can be composed of one or more of carbon atoms, hydrogen atoms, oxygen atoms, nitrogen atoms, sulfur atoms, and halogen atoms.

The organic group bonded to the central atom of the cation may have only a single bond, or may have double or triple bonds. The organic group may be linear or branched. The organic groups may also be bonded to each other to form a ring structure. Substituents may be further bonded to the organic group.

Ammonium cations, phosphonium cations, or sulfonium cations are preferable as the cations that make up the organic iodine remover 2. According to these cations, the organic iodine remover 2 with high organic iodine dissolution capacity can be obtained relatively easily by an appropriate selection of substituents.

For example, 1-butyl-3-methylimidazolium bis(trifluoromethylsulfonyl)amide does not dissolve methyl iodine and causes phase separation. In contrast, trihexyl(tetradecyl) phosphonium bis(trifluoromethylsulfonyl)amide, which has the same anion and different cation, can dissolve methyl iodine.

As ammonium cation, any of quaternary ammonium cation, tertiary ammonium cation, secondary ammonium cation, and primary ammonium cation can also be used. However, the quaternary ammonium cation is preferable from the viewpoint of increasing the dissolution capacity of the organic iodine.

As phosphonium cation, any of quaternary phosphonium cation, tertiary phosphonium cation, secondary phosphonium cation, and primary phosphonium cation can also be used. However, the quaternary phosphonium cation is preferable from the viewpoint of increasing the dissolution capacity of the organic iodine.

As sulfonium cation, any of tertiary sulfonium cation, secondary sulfonium cation, and primary phosphonium cation can also be used. However, the tertiary sulfonium cation is preferable from the viewpoint of increasing the dissolution capacity of the organic iodine.

It is preferable that the organic group bonded to the central atom of the cation has a carbon number of two or more. When the carbon number is less than two, there is a possibility that thermal decomposition occurs at the ambient temperature during the venting. In contrast, when the carbon number is two or higher, high heat resistance can be obtained, and thus, high-temperature vent gases can be stably processed.

For example, it has been confirmed that, in 1-butyl-3-methylimidazolium iodide, the methyl group of the cation is eliminated at 160° C. and causes autolysis. However, when the number of carbons in the organic group bonded to the central atom of the cation is large and the organic group is bulky, high heat resistance can be obtained, and thus, the organic iodine can be efficiently trapped at the ambient temperature during venting.

Both organic anion and inorganic anion can also be used as the anions that make up the organic iodine remover 2. As the anions that make up the organic iodine remover 2, ions with high nucleophilicity are preferable because of the strong action of decomposing the organic iodine, and those in which charged elements are present at the ends except for hydrogen elements are particularly preferable.

Examples of the anions that make up the organic iodine remover 2 include organic anions that are negatively charged on carbon atom (C), sulfur atom (S), nitrogen atom (N), or oxygen atom (O), inorganic anions that are negatively charged on oxygen atom (O), or inorganic anions that are negatively charged on halogen atom. According to these anions, it is possible to obtain the organic iodine remover 2 with a high capacity of decomposing the organic iodine.

Specific examples of organic anions that are negatively charged on carbon atom (C) include methyl anion ($H_3C^-$), primary carboanion ($H_2RC^-$), secondary carboanion ($HR_2C^-$), tertiary carboanion ($R_3C^-$), cyanide ion ($NC^-$), alkynide anion (RCC⁻), and the like. These organic anions may have any substituents on carbon atoms, organic groups, or alkyl groups.

Specific examples of organic anions that are negatively charged on sulfur atom (S) include the sulfanide anion (RS⁻). These organic anions may have any substituents on sulfur atoms.

Specific examples of organic anions that are negatively charged on nitrogen atom (N) include azide anion ($N_3^-$), primary amide anion ($H_2N^-$), secondary amide anion ($HRN^-$), tertiary amide anion ($R_2N^-$), and the like. These organic anions may have any substituents on nitrogen atoms or organic groups.

Specific examples of organic anions that are negatively charged on the oxygen atom (O) include alkoxide anion ($RO^-$), carboxylate anion ($RCO_2^-$), phosphorous acid anion ($RPO_3^-$), sulfite anion ($RSO_3^-$), phosphate anion ($RPO_4^-$), hypophosphorous acid anion ($R_2PO_2^-$), methoxide anion ($R_3CO^-$), and the like. These organic anions may have any substituents on oxygen atoms or alkyl groups.

Specific examples of inorganic anions that are negatively charged on the oxygen atom (O) include hydroxide ion ($HO^-$), nitrite anion ($NO_2^-$), trifluoride anion ($FO_3^-$), chlorate anion ($ClO_3^-$), bromic acid anion ($BrO_3^-$), iodic acid anion ($IO_3^-$), fluorotetraoxygen anion ($FO_4^-$), perchlorate anion ($ClO_4^-$), perbromic acid anion ($BrO_4^-$), periodic acid anion ($IO_4^-$), and the like.

Specific examples of inorganic anions that are negatively charged on the halogen atom include fluoride ion ($F^-$), chloride ion ($Cl^-$), bromide ion ($Br^-$), iodide ion ($I^-$), trifluoride ion ($F_3^-$), trichloride ion ($Cl_3^-$), tribromide ion ($Br_3^-$), and triiodide ion ($I_3^-$), and the like.

The substituent bonded to the anion may have only a single bond, or may have double or triple bonds. The substituent may be linear or branched. The substituents may also be bonded to each other to form a ring structure. Substituents may further be bonded to the substituents bonded to the anion.

Specific examples of substituents bonded to cations or anions include: alkyl group such as ethyl group, propyl group, iso-propyl group, butyl group, sec-butyl group, iso-butyl group, tert-butyl group, pentyl group, hexyl group, heptyl group, octyl group, nonyl group, and decyl group; alkenyl group such as vinyl group, allyl group, butenyl group, and pentenyl group; alkynyl group such as ethynyl group, propynyl group, butynyl group, and pentynyl group; cycloalkyl group such as cyclopropyl group, cyclobutyl group, cyclopentyl group, and cyclohexyl group; aryl group such as phenyl group, tolyl group, xylyl group, naphthyl group, and biphenyl group; and arylalkyl group such as benzyl group, phenethyl group, and styryl group.

Other specific examples of substituents bonded to cations and anions include: phosphino group, alkylphosphino group, dialkylphosphino group, and the like; amino group, alkylamino group, dialkylamino group, and the like; sulfanyl group, alkylsulfanyl group, and the like; hydroxy group, alkoxy group, and the like; halogen atoms such as fluorine atom, bromine atom; and nitro group, cyano group, and the like.

Specific examples of the organic iodine remover 2 include trihexyl(tetradecyl)phosphonium chloride and the like.

As the trapping material 3, a metal or a metal compound that can be bonded to iodine ion can be used. As a metal, a pure metal or an alloy can be used. As a metal compound, metal salt, metal-oxide catalyst, and the like can be used. In general, a metal or a metal compound has the properties of forming chemical bonds with iodide ion or the like. Therefore, in the filtered containment venting vessel 1, the organic iodine remover 2 and the trapping material 3 are used together to trap the organic iodine in the vent gas.

As expressed in the following expression (2), according to the trapping material (M), the iodide ion (I⁻) can be immobilized as metal iodide (MI). Metal iodide (MI) is relatively stable even under high-temperature and high-dose conditions. Therefore, the diffusion of radioiodine can be suppressed more reliably than that in a case of using only the organic iodine remover 2.

$$I^- + M \rightarrow MI + e^- \qquad (2)$$

It is preferable that the trapping material 3 has the properties of being insoluble and non-reactive to the organic iodine remover 2, and not forming the chemical bonds with the organic iodine remover 2. According to the trapping material 3, the dissolution or decomposition of the organic iodine by the organic iodine remover 2 will be less likely to be inhibited. The action of the trapping material 3 itself is less likely to deteriorate.

As the trapping material 3, a zero-valent metal composed of transition elements classified into the fourth period to the sixth period of the fourth group to the twelfth group, a metal salt composed of transition elements classified into the fourth period to the sixth period of the fourth group to the twelfth group, or a metal-oxide catalyst composed of transition elements classified into the fourth period to the sixth period of the fourth group to the twelfth group, are preferable. These trapping materials 3 have the general properties of not forming the chemical bonds with the organic iodine remover 2, and thus, the action of the organic iodine remover 2 or the trapping material 3 can be appropriately ensured.

In a case where the trapping material 3 is dispersed as a dispersoid in the organic iodine remover 2, the particle size of the trapping material 3 is preferably 300 nm or less, and more preferably 200 nm or less. As the particle size of the trapping material 3 decreases, it becomes more difficult for the trapping material 3 to settle in the organic iodine remover 2. The trapping material 3 can be dispersed in the organic iodine remover 2 with high uniformity, and thus, the trapping efficiency of the iodine ion increases.

In a case where the trapping material 3 is dispersed as a dispersoid in the organic iodine remover 2, it is preferable that the amount of the trapping material 3 is 0.1% by mass or more and 10% by mass or less with respect to the 100% by mass of the organic iodine remover. When the trapping material 3 is 0.1% by mass or more, the effect of improving the trapping efficiency of iodine ions can be obtained. Meanwhile, when the amount of the trapping material 3 exceeds 10% by mass, the effectiveness of the trapping material 3 reaches a peak. When the amount of the trapping material 3 is 10% by mass or less, the amount of trapping material 3 used can be suppressed while improving the trapping efficiency of iodine ions.

Specific examples of the trapping material 3 include metallic silver (zero-valent silver), silver chloride (I), and silver oxide (I). For example, nanoparticles of metallic silver and the like can be obtained by a liquid-phase method such as a chemical reduction method and an in-liquid plasma method, a gas-phase method such as active liquid surface continuous vacuum deposition method, a solid-phase method such as a mechanochemical method, a thermal decomposition method, and the like. Nanoparticles of metallic compounds such as silver chloride can be obtained by liquid phase synthesis method and the like.

In the filtered containment venting apparatus 100, in the filtered containment venting vessel 1, the organic iodine among the radioactive materials contained in the vent gas is dissolved in the organic iodine remover 2 and decomposed into organic components and iodide ions. Iodine ions, such as iodide ions, are trapped as metal iodides by the trapping material 3. When the vent gas flows into the filtered containment venting vessel 1, the vent gas condenses and the condensed water is stored. Among the radioactive materials contained in the vent gas, aerosols, inorganic iodine, and the like are trapped in the condensed water. The gas from which the radioactive materials have been sufficiently removed is released into the environment through the outlet pipe 11 and the exhaust pipe 12.

The filtered containment venting vessel 1 can also be equipped with a baffle (not illustrated) that exerts resistance on the vent gas flowing into the vessel. For example, an orifice-shaped baffle plate, a spiral plate, a perforated plate such as metal mesh or perforated metal, or a porous material such as ceramic can be used as a baffle. The baffle can be provided at the height of the liquid phase portion inside the filtered containment venting vessel 1.

The organic iodine flowing into the filtered containment venting vessel 1 is estimated to be in gaseous form. The dissolution of the gaseous organic iodine or the decomposition of the organic iodine is considered to be proceed by diffusiophoresis, thermal phoresis, brownian diffusion, convection and the like in the bubble. When a baffle is installed in the filtered containment venting vessel 1, the stagnation time of the bubbles ejected into the vessel becomes longer, and the contact time between the organic iodine and the organic iodine remover 2 or the contact time between the iodine ion and the trapping material 3 becomes longer, and thus, it is possible to improve the trapping efficiency of the organic iodine.

According to the above-described filtered containment venting apparatus (organic iodine trapping apparatus) 100, the organic iodine remover 2 and the trapping material 3 are disposed in the filtered containment venting vessel 1, the trapping material 3 is contained in the organic iodine remover 2 as a dispersoid, and thus, the organic iodine in the vent gas can be efficiently trapped by using the existing filtered containment venting vessel 1. The organic iodine remover 2 and the trapping material 3 can be used together in the existing filtered containment venting vessel 1 without changing the apparatus design or the apparatus structure. Since the trapping material 3 is dispersed in the organic iodine remover 2, it is possible to quickly immobilize the iodine ions generated by the decomposition of the organic iodine. By the organic iodine remover 2 and the trapping material 3, high trapping efficiency with respect to the organic iodine can be obtained, and thus, the amount of the organic iodine remover 2 used can be suppressed. Therefore, there is no need to add complicated or large equipment to the existing filtered containment venting vessel, unlike a case where a remover of the related art such as silver zeolite or activated carbon is disposed downstream of the filtered containment venting vessel. Accordingly, according to such an apparatus, the organic iodine can be efficiently trapped while suppressing the processing cost of the organic iodine without using the complicated or large equipment.

Substances classified into ambient temperature molten salt, ionic liquid, interfacial active agent, quaternary salt, and phase transfer catalyst can be used as the organic iodine remover 2. In particular, the ionic liquid has been commercialized for general industry and is easily available. The ionic liquid has high non-volatile properties and is sufficiently heat resistant with respect to vent gas of approximately 200° C., which is expected to flow into the filtered containment venting apparatus during a nuclear reactor accident. The ionic liquid also has excellent radiation resistance, and has the properties of dissolving the radioactive materials and the like in high concentrations. The organic iodine is a volatile substance that is insoluble in water, but according to the ionic liquid, high trapping efficiency with respect to the organic iodine due to ionic interaction can be obtained. In a case of using ambient temperature molten salt, interfacial active agent, quaternary salt, phase transfer catalyst and the like as the organic iodine remover 2, similar trapping efficiency can be obtained. In a case of using a substance which is liquid at 200° C. or higher as the organic iodine remover 2, it is possible to trap the organic iodine in the liquid phase, and thus, the efficiency is higher.

As the trapping material 3, a metal or a metal compound such as metal salt or metal-oxide catalyst is used. Since a metal or a metal compound is bonded to the iodide ions or the like, the radioiodine can be immobilized as metal iodide. When the trapping material 3 is used together with the organic iodine remover 2, the trapping efficiency of the organic iodine measured when a gas containing the organic iodine is vented can be increased to 99.9% or more at 160° C. (stagnation time: approximately 0.5 sec), and stable trapping efficiency can be obtained even at high temperature or high dose.

Second Embodiment

Figure 2:
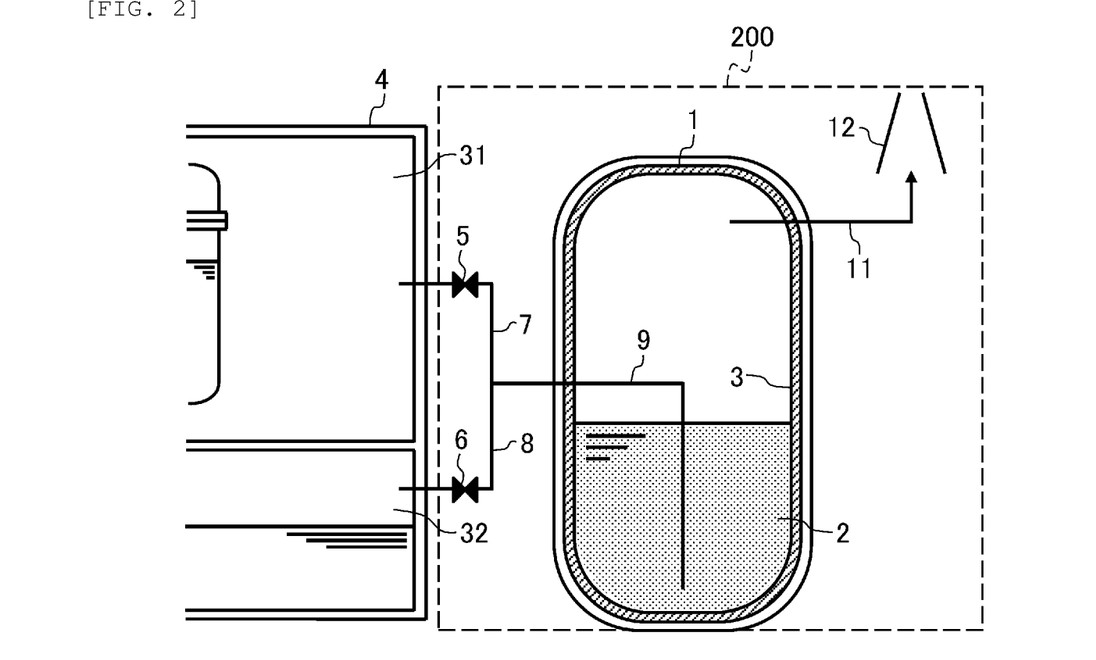
FIG. 2 is a sectional view schematically illustrating an organic iodine removing apparatus according to a second embodiment.

FIG. 2 is a sectional view schematically illustrating an organic iodine removing apparatus according to a second embodiment.

FIG. 2 illustrates an example of the application of the present invention to a filtered containment venting apparatus that traps radioactive materials released from the inside of a nuclear reactor container vessel, as an example of the organic iodine trapping apparatus that traps the organic iodine.

As illustrated in FIG. 2, similar to the above-described filtered containment venting apparatus 100, a filtered containment venting apparatus (organic iodine trapping apparatus) 200 according to the present embodiment includes the filtered containment venting vessel (trapping vessel) 1, the organic iodine remover 2, the trapping material 3, the isolation valves 5 and 6, the dry well vent pipe 7, the wet well vent pipe 8, the inlet pipe 9, the outlet pipe 11, and the exhaust pipe 12.

The filtered containment venting apparatus 200 differs from the above-described filtered containment venting apparatus 100 in that the trapping material 3 is contained in the inner layer of the filtered containment venting vessel 1. In the filtered containment venting apparatus 200 illustrated in FIG. 2, the organic iodine remover 2 and the trapping material 3 are disposed in the filtered containment venting vessel 1 even before the venting is performed. The organic iodine remover 2 is stored in the filtered containment venting vessel 1. The trapping material 3 is contained in the inner layer that forms the inner surface of the filtered containment venting vessel 1.

In the filtered containment venting apparatus 200, the same substance as that in the above-described filtered containment venting apparatus 100 can be used as the organic iodine remover 2 or the trapping material 3.

The inner layer of the filtered containment venting vessel 1 containing the trapping material 3 may be provided as a coating with respect to the vessel main body or as an inner vessel member with respect to the outer vessel member. The coating can be provided, for example, by coating process performed by coating, drying, or baking, using paste or paint containing the trapping material 3. The coating can also be provided by a plating process using a plating solution containing the trapping material 3. The inner vessel member can be provided by welding, gluing, diffusion bonding, brazing, soldering, and the like, for example, using a member formed of the trapping material 3.

The inner layer of the filtered containment venting vessel 1 containing the trapping material 3 is provided on the entire inner surface of the filtered containment venting vessel 1 in FIG. 2. However, the inner layer of the filtered containment venting vessel 1 containing the trapping material 3 may be provided at a part of the inner surface of the filtered containment venting vessel 1. For example, the inner layer of the filtered containment venting vessel 1 can also be provided only on the lower inner surface of the filtered containment venting vessel 1 or only on the inner surface below the liquid surface of the organic iodine remover 2.

According to the above-described filtered containment venting apparatus (organic iodine trapping apparatus) 200, the organic iodine remover 2 and the trapping material 3 are disposed in the filtered containment venting vessel 1, the trapping material 3 is contained in the inner layer of the filtered containment venting vessel 1, and thus, the organic iodine in the vent gas can be efficiently trapped by using the existing filtered containment venting vessel 1. Only by adding the coating containing the trapping material 3 or the inner vessel member to the existing filtered containment venting vessel 1 without largely changing the apparatus design or the apparatus structure, the organic iodine remover 2 and the trapping material 3 can be used together. Since the trapping material 3 is contained in the inner layer of the filtered containment venting vessel 1, the iodine ions generated by the decomposition of the organic iodine can be immobilized on the inner surface of the filtered containment venting vessel 1 during convective agitation by the inflow of vent gas. By the organic iodine remover 2 and the trapping material 3, high trapping efficiency with respect to the organic iodine can be obtained, and thus, the amount of the organic iodine remover 2 used can be suppressed. Therefore, there is no need to add complicated or large equipment to the existing filtered containment venting vessel, unlike a case where a remover of the related art such as silver zeolite or activated carbon is disposed downstream of the filtered containment venting vessel. Accordingly, according to such an apparatus, the organic iodine can be efficiently trapped while suppressing the processing cost of the organic iodine without using the complicated or large equipment.

Third Embodiment

Figure 3:
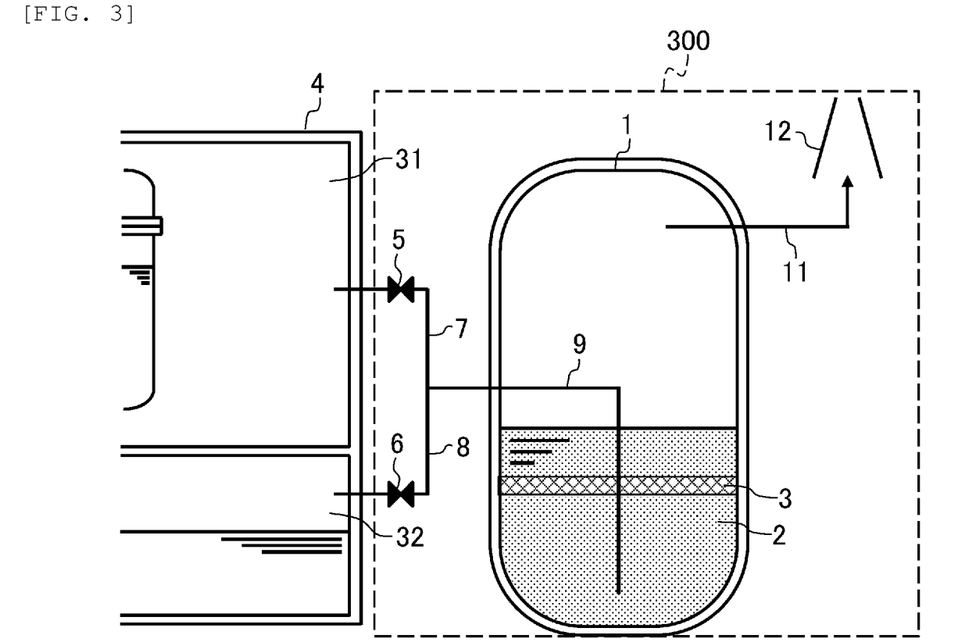
FIG. 3 is a sectional view schematically illustrating an organic iodine removing apparatus according to a third embodiment.

FIG. 3 is a sectional view schematically illustrating an organic iodine removing apparatus according to a third embodiment.

FIG. 3 illustrates an example of the application of the present invention to a filtered containment venting apparatus that traps radioactive materials released from the inside of a nuclear reactor container vessel, as an example of the organic iodine trapping apparatus that traps the organic iodine.

As illustrated in FIG. 3, similar to the above-described filtered containment venting apparatus 100, a filtered containment venting apparatus (organic iodine trapping apparatus) 300 according to the present embodiment includes the filtered containment venting vessel (trapping vessel) 1, the organic iodine remover 2, the trapping material 3, the isolation valves 5 and 6, the dry well vent pipe 7, the wet well vent pipe 8, the inlet pipe 9, the outlet pipe 11, and the exhaust pipe 12.

The filtered containment venting apparatus 300 differs from the above-described filtered containment venting apparatus 100 in that the trapping material 3 is disposed as the fixed floor in the filtered containment venting vessel 1. In the filtered containment venting apparatus 300 illustrated in FIG. 3, the organic iodine remover 2 and the trapping material 3 are disposed in the filtered containment venting vessel 1 even before the venting is performed. The organic iodine remover 2 is stored in the filtered containment venting vessel 1. The trapping material 3 is made of mesh wire and is fixed to the side surface inside the filtered containment venting vessel 1.

In the filtered containment venting apparatus 300, the same substance as that in the above-described filtered containment venting apparatus 100 can be used as the organic iodine remover 2 or the trapping material 3.

The trapping material 3 that makes up the fixed floor is disposed in the liquid phase portion below the liquid surface of the organic iodine remover 2 in FIG. 3. In this arrangement, iodine ions generated by the decomposition of the organic iodine can be quickly immobilized in the liquid phase. However, the trapping material 3 that makes up the fixed floor may be disposed in the gas phase portion of the filtered containment venting vessel 1, or in both the liquid phase portion and the gas phase portion of the filtered containment venting vessel 1.

The trapping material 3 that makes up the fixed floor is in the form of a mesh wire in FIG. 3. According to the form of the mesh wire, the specific surface area is larger, and thus, higher trapping efficiency of the organic iodine and lighter weight of the trapping material 3 can be achieved. However, the trapping material 3 that makes up the fixed floor may take other forms, such as perforated metal, expanded metal, porous plate, porous sintered body, porous foam, and the like.

The trapping material 3 that makes up the fixed floor is fixed to the side surface in the filtered containment venting vessel 1 in FIG. 3. However, the trapping material 3 that makes up the fixed floor may be fixed to the bottom surface in the filtered containment venting vessel 1, may be supported by the ceiling surface in the filtered containment venting vessel 1, or may be housed non-fixedly in the filtered containment venting vessel 1. The trapping material 3 that makes up the fixed floor may have both a function of subdividing and a function of rectifying the bubbles in the vent gas.

In a case where the trapping material 3 is disposed as a fixed floor in the filtered containment venting vessel 1, it is preferable that the amount of trapping material 3 is between 0.1% by mass or more and 10% by mass or less with respect to the 100% by mass of the organic iodine remover. When the trapping material 3 is 0.1% by mass or more, the effect of improving the trapping efficiency of iodine ions can be obtained. Meanwhile, when the amount of the trapping material 3 exceeds 10% by mass, the effectiveness of the trapping material 3 reaches a peak. When the amount of the trapping material 3 is 10% by mass or less, the amount of trapping material 3 used can be suppressed while improving the trapping efficiency of iodine ions.

According to the above-described filtered containment venting apparatus (organic iodine trapping apparatus) 300, the organic iodine remover 2 and the trapping material 3 are disposed in the filtered containment venting vessel 1, the trapping material 3 is disposed in the filtered containment venting vessel 1 as a fixed floor, and thus, the organic iodine in the vent gas can be efficiently trapped by using the existing filtered containment venting vessel 1. Only by adding the trapping material 3 that makes up the fixed floor to the existing filtered containment venting vessel 1 without largely changing the apparatus design or the apparatus structure, the organic iodine remover 2 and the trapping material 3 can be used together. Since the trapping material 3 is disposed in the filtered containment venting vessel 1 as a fixed floor, the iodine ions generated by the decomposition of the organic iodine can be immobilized in accordance with the capacity of the fixed floor during convective agitation by the inflow of vent gas. By the organic iodine remover 2 and the trapping material 3, high trapping efficiency with respect to the organic iodine can be obtained, and thus, the amount of the organic iodine remover 2 used can be suppressed. Therefore, there is no need to add complicated or large equipment to the existing filtered containment venting vessel, unlike a case where a remover of the related art such as silver zeolite or activated carbon is disposed downstream of the filtered containment venting vessel. Accordingly, according to such an apparatus, the organic iodine can be efficiently trapped while suppressing the processing cost of the organic iodine without using the complicated or large equipment.

Fourth Embodiment

Figure 4:
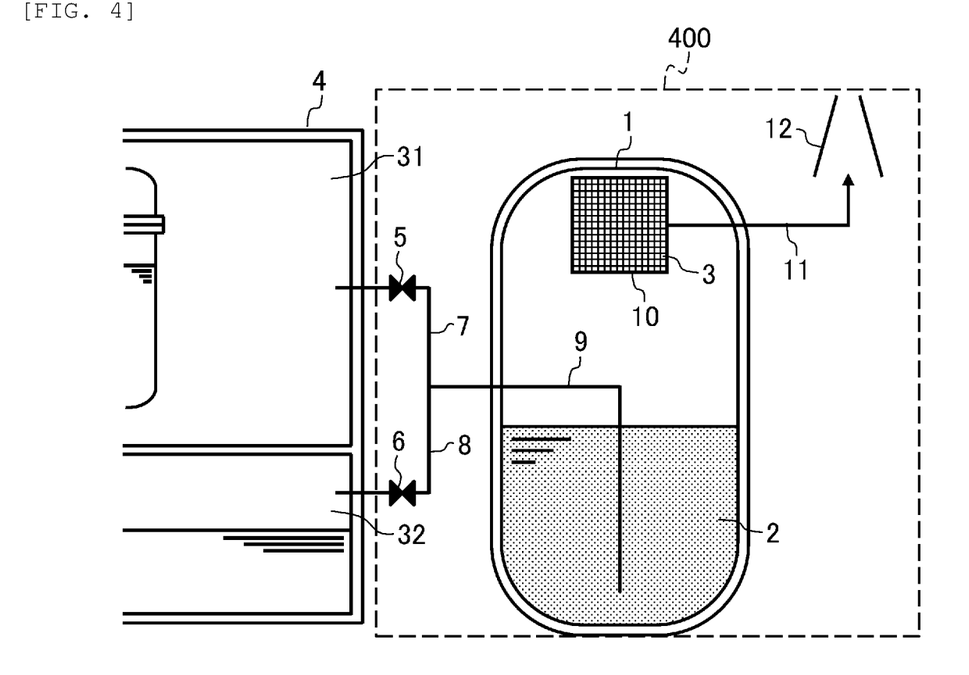
FIG. 4 is a sectional view schematically illustrating an organic iodine removing apparatus according to a fourth embodiment.

FIG. 4 is a sectional view schematically illustrating an organic iodine removing apparatus according to a fourth embodiment.

FIG. 4 illustrates an example of the application of the present invention to a filtered containment venting apparatus that traps radioactive materials released from the inside of a nuclear reactor container vessel, as an example of the organic iodine trapping apparatus that traps the organic iodine.

As illustrated in FIG. 4, similar to the above-described filtered containment venting apparatus 100, a filtered containment venting apparatus (organic iodine trapping apparatus) 400 according to the present embodiment includes the filtered containment venting vessel (trapping vessel) 1, the organic iodine remover 2, the trapping material 3, the isolation valves 5 and 6, the dry well vent pipe 7, the wet well vent pipe 8, the inlet pipe 9, the outlet pipe 11, and the exhaust pipe 12.

The filtered containment venting apparatus 400 differs from the above-described filtered containment venting apparatus 100 in that a filter 10 is provided in the gas phase portion in the filtered containment venting vessel 1 and the trapping material 3 is contained as a part of the filter 10. In the filtered containment venting apparatus 400 illustrated in FIG. 4, the organic iodine remover 2 and the trapping material 3 are disposed in the filtered containment venting vessel 1 even before the venting is performed. The organic iodine remover 2 is stored in the filtered containment venting vessel 1. The trapping material 3 makes up a part of the existing filter 10.

The filter 10 is equipment which is provided in a general filtered containment venting vessel and traps aerosols released into the gas phase portion in the vessel by adhesion, collision, and the like. In the filtered containment venting apparatus 400 illustrated in FIG. 4, the outlet pipe 11 is connected to the secondary side of the filter 10, and the gas supplied to the filter 10 is released into the environment.

In the filtered containment venting apparatus 400, the same substance as that in the above-described filtered containment venting apparatus 100 can be used as the organic iodine remover 2 or the trapping material 3.

The trapping material 3 that makes up a part of the filter 10 may be provided as a coating on the existing filter 10 or as a filter medium along with the existing filter 10. The coating can be provided, for example, by coating process performed by coating, drying, or baking, using paste or paint containing the trapping material 3. The coating can also be provided by a plating process using a plating solution containing the trapping material 3. The filter 10 may be formed by mixing the filter medium such as fibers by the trapping material 3 with the filter medium such as existing fibers, or by laminating the filter mediums.

According to the above-described filtered containment venting apparatus (organic iodine trapping apparatus) 400, the organic iodine remover 2 and the trapping material 3 are disposed in the filtered containment venting vessel 1, the trapping material 3 is contained as a part of the filter 10 installed in the gas phase portion in the filtered containment venting vessel 1, and thus, the organic iodine in the vent gas can be efficiently trapped by using the existing filtered containment venting vessel 1. Only by adding the coating by the trapping material 3 or the filter medium to the filter 10 provided in the existing filtered containment venting vessel 1 without largely changing the apparatus design or the apparatus structure, the organic iodine remover 2 and the trapping material 3 can be used together. Since the trapping material 3 is contained as a part of the filter 10, even in a case where the iodine ion generated by the decomposition of the organic iodine is released into the gas phase portion, the iodine ion can be immobilized in the filtered containment venting vessel 1. Even in a case where elemental iodine is released into the gas phase portion, the iodine ion can be reduced to metal iodide and immobilized by the trapping material 3. By the organic iodine remover 2 and the trapping material 3, high trapping efficiency with respect to the organic iodine can be obtained, and thus, the amount of the organic iodine remover 2 used can be suppressed. Therefore, there is no need to add complicated or large equipment to the existing filtered containment venting vessel, unlike a case where a remover of the related art such as silver zeolite or activated carbon is disposed downstream of the filtered containment venting vessel. Accordingly, according to such an apparatus, the organic iodine can be efficiently trapped while suppressing the processing cost of the organic iodine without using the complicated or large equipment. Aerosols can be efficiently trapped by the filter 10.

Fifth Embodiment

Figure 5:
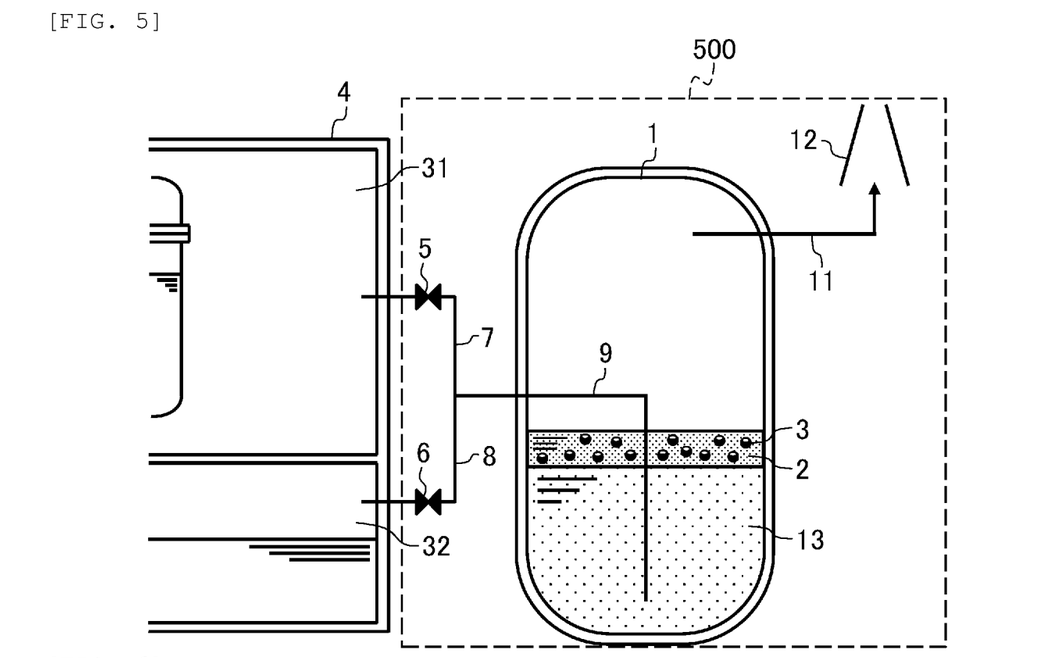
FIG. 5 is a sectional view schematically illustrating an organic iodine removing apparatus according to a fifth embodiment.

FIG. 5 is a sectional view schematically illustrating an organic iodine removing apparatus according to a fifth embodiment.

FIG. 5 illustrates an example of the application of the present invention to a filtered containment venting apparatus that traps radioactive materials released from the inside of a nuclear reactor container vessel, as an example of the organic iodine trapping apparatus that traps the organic iodine.

As illustrated in FIG. 5, similar to the above-described filtered containment venting apparatus 100, a filtered containment venting apparatus (organic iodine trapping apparatus) 500 according to the present embodiment includes the filtered containment venting vessel (trapping vessel) 1, the organic iodine remover 2, the trapping material 3, the isolation valves 5 and 6, the dry well vent pipe 7, the wet well vent pipe 8, the inlet pipe 9, the outlet pipe 11, and the exhaust pipe 12.

The filtered containment venting apparatus 500 differs from the above-described filtered containment venting apparatus 100 in that scrubbing water 13 is stored in the filtered containment venting vessel 1. In the filtered containment venting apparatus 500 illustrated in FIG. 5, the organic iodine remover 2, the trapping material 3, and the scrubbing water 13 are disposed in the filtered containment venting vessel 1 even before the venting is performed. The organic iodine remover 2 is considered to be a substance with a lower specific gravity than that of the scrubbing water 13 and is stored in the filtered containment venting vessel 1. The trapping material 3 is contained as a dispersoid in the organic iodine remover 2.

As the scrubbing water 13, water or an aqueous solution in which sodium thiosulfate and an alkali such as sodium hydroxide are dissolved is used. The scrubbing water 13 is mainly used to trap inorganic iodine and aerosol.

In the filtered containment venting apparatus 500, the same substance as that in the above-described filtered containment venting apparatus 100 can be used as the organic iodine remover 2 or the trapping material 3. However, it is preferable that the trapping material 3 is insoluble and non-reactive to the scrubbing water. According to the trapping material 3, even when coming into contact with the scrubbing water 13, the action of the trapping material 3 itself is unlikely to be deteriorated.

In a case where the trapping material 3 is dispersed as a dispersoid in the organic iodine remover 2, the particle size of the trapping material 3 is preferably 300 nm or less, and more preferably 200 nm or less. As the particle size of the trapping material 3 decreases, it becomes more difficult for the trapping material 3 to settle in the organic iodine remover 2. The trapping material 3 can be dispersed in the organic iodine remover 2 with high uniformity, and thus, the trapping efficiency of the iodine ion increases.

In a case where the trapping material 3 is dispersed as a dispersoid in the organic iodine remover 2, it is preferable that the amount of the trapping material 3 is 0.1% by mass or more and 10% by mass or less with respect to the 100% by mass of the organic iodine remover. When the trapping material 3 is 0.1% by mass or more, the effect of improving the trapping efficiency of iodine ions can be obtained. Meanwhile, when the amount of the trapping material 3 exceeds 10% by mass, the effectiveness of the trapping material 3 reaches a peak. When the amount of the trapping material 3 is 10% by mass or less, the amount of trapping material 3 used can be suppressed while improving the trapping efficiency of iodine ions.

In the filtered containment venting apparatus 500, when the isolation valve 5 is opened, the high-temperature and high-pressure steam in the dry well 31 flows into the filtered containment venting vessel 1 through the dry well vent pipe 7. When the isolation valve 6 is opened, the high-temperature and high-pressure steam in the wet well 32 flows into the filtered containment venting vessel 1 through the wet well vent pipe 8. The vent gas containing radioactive materials is passed through the filtered containment venting vessel 1 containing the organic iodine remover 2 and the trapping material 3.

In the filtered containment venting apparatus 500, in the filtered containment venting vessel 1, among the radioactive materials contained in the vent gas, aerosols, inorganic iodine, and the like are trapped in the scrubbing water 13 or in the condensed water obtained by condensing the vent gas. Organic iodine is dissolved in the organic iodine remover 2 and decomposed into organic components and iodide ions. Iodine ions, such as iodide ions, are trapped as metal iodides by the trapping material 3. The gas from which the radioactive materials have been sufficiently removed is released into the environment through the outlet pipe 11 and the exhaust pipe 12.

The organic iodine remover 2 and the scrubbing water 13 do not mix with each other and form a multi-layered liquid in the filtered containment venting vessel 1 in FIG. 5. The organic iodine remover 2, which has a small specific gravity, forms the upper layer, and the scrubbing water 13, which has a large specific gravity, forms the lower layer. The vent gas is introduced from the lower layer side of the multilayered liquid.

With such an arrangement, after inorganic iodine or aerosols contained in the vent gas is trapped by the scrubbing water 13, the organic iodine contained in the vent gas can be efficiently trapped by the organic iodine remover 2 and the trapping material 3. Not only the organic iodine, but also an iodine ion or elemental iodine derived from the inorganic iodine can be immobilized on the trapping material 3 in the upper layer before being released into the gas phase portion.

However, the specific gravity or compatibility relationship between the organic iodine remover 2 and the scrubbing water 13 is not restricted. The organic iodine remover 2 may be a substance with a higher specific gravity than that of the scrubbing water 13. The organic iodine remover 2 may form the lower layer and the scrubbing water 13 may form the upper layer.

According to the above-described filtered containment venting apparatus (organic iodine trapping apparatus) 500, the organic iodine remover 2 and the trapping material 3 are disposed in the filtered containment venting vessel 1, the trapping material 3 is contained in the organic iodine remover 2 as a dispersoid, and thus, the organic iodine in the vent gas can be efficiently trapped by using the existing filtered containment venting vessel 1. The organic iodine remover 2 and the trapping material 3 can be used together in the existing filtered containment venting vessel 1 without changing the apparatus design or the apparatus structure. Since the trapping material 3 is dispersed in the organic iodine remover 2, it is possible to quickly immobilize the iodine ions generated by the decomposition of the organic iodine. By the organic iodine remover 2 and the trapping material 3, high trapping efficiency with respect to the organic iodine can be obtained, and thus, the amount of the organic iodine remover 2 used can be suppressed. Therefore, there is no need to add complicated or large equipment to the existing filtered containment venting vessel, unlike a case where a remover of the related art such as silver zeolite or activated carbon is disposed downstream of the filtered containment venting vessel. Accordingly, according to such an apparatus, the organic iodine can be efficiently trapped while suppressing the processing cost of the organic iodine without using the complicated or large equipment. Aerosols or inorganic iodine can be efficiently trapped by the scrubbing water 13.

Sixth Embodiment

Figure 6:
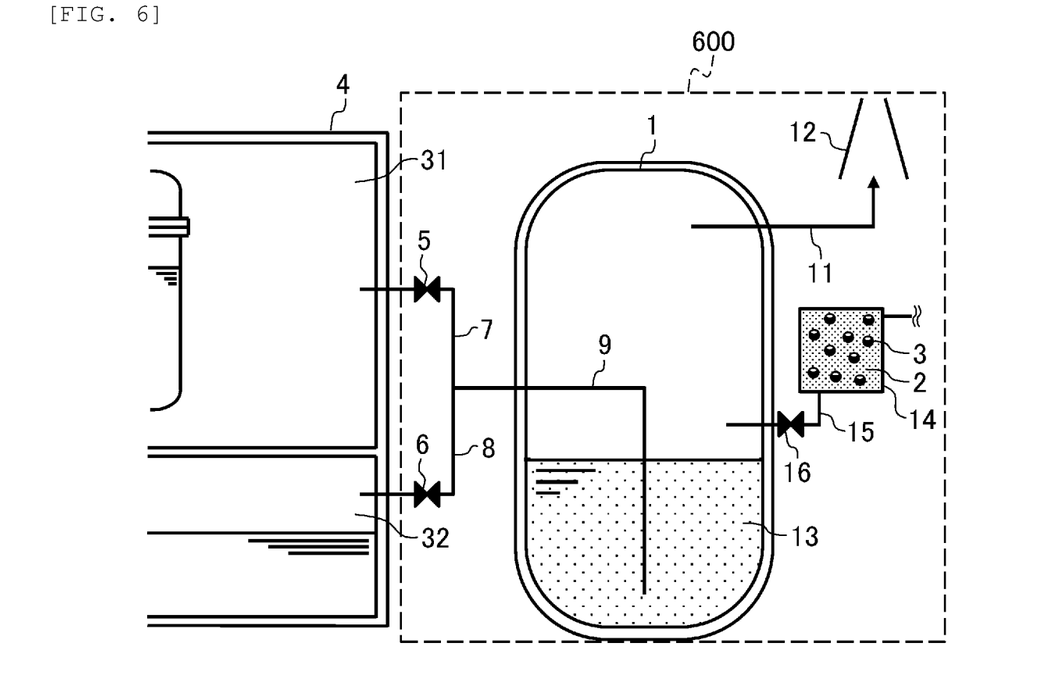
FIG. 6 is a sectional view schematically illustrating an organic iodine removing apparatus according to a sixth embodiment.

FIG. 6 is a sectional view schematically illustrating an organic iodine removing apparatus according to a sixth embodiment.

FIG. 6 illustrates an example of the application of the present invention to a filtered containment venting apparatus that traps radioactive materials released from the inside of a nuclear reactor container vessel, as an example of the organic iodine trapping apparatus that traps the organic iodine.

As illustrated in FIG. 6, similar to the above-described filtered containment venting apparatus 100, a filtered containment venting apparatus (organic iodine trapping apparatus) 600 according to the present embodiment includes the filtered containment venting vessel (trapping vessel) 1, the organic iodine remover 2, the trapping material 3, the isolation valves 5 and 6, the dry well vent pipe 7, the wet well vent pipe 8, the inlet pipe 9, the outlet pipe 11, and the exhaust pipe 12.

The filtered containment venting apparatus 600 differs from the above-described filtered containment venting apparatus 100 in that the scrubbing water 13 is stored in the filtered containment venting vessel 1, and a storage vessel 14, an injection pipe 15, and an on-off valve 16 are added.

In the filtered containment venting apparatus 600, the storage vessel 14 containing the organic iodine remover 2 and the trapping material 3 is connected to the filtered containment venting vessel 1 through the injection pipe 15. The injection pipe 15 is equipped with the on-off valve 16. The on-off valve 16 can open and close the pipeline from the storage vessel 14 to the filtered containment venting vessel 1.

In the filtered containment venting apparatus 600, the organic iodine remover 2 and the trapping material 3 are stored in the storage vessel 14 even before the venting is performed. The scrubbing water 13 is stored in the filtered containment venting vessel 1 since before the venting is performed. The organic iodine remover 2 and the trapping material 3 are injected into the filtered containment venting vessel 1 to trap organic iodine when the venting is performed, before the vent gas is passed through the filtered containment venting vessel 1. The trapping material 3 is contained as a dispersoid in the organic iodine remover 2.

In the filtered containment venting apparatus 600, the same substance as that in the above-described filtered containment venting apparatus 100 can be used as the organic iodine remover 2 or the trapping material 3. However, it is preferable that the trapping material 3 is insoluble and non-reactive to the scrubbing water. According to the trapping material 3, even when coming into contact with the scrubbing water 13, the action of the trapping material 3 itself is unlikely to be deteriorated. The particle size of the trapping material 3, the amount of trapping material 3, and the specific gravity and compatibility relationship between the organic iodine remover 2 and the scrubbing water 13 can be the same as those of the above-described filtered containment venting apparatus 500.

In the filtered containment venting apparatus 600, when the venting is performed, the on-off valve 16 is opened before the isolation valves 5 and 6 are opened. When the on-off valve 16 is opened, the organic iodine remover 2 and the trapping material 3 prepared in the storage vessel 14 are injected into the filtered containment venting vessel 1 through the injection pipe 15. The injection of the organic iodine remover 2 and the trapping material 3 can be performed, for example, by a method of using water load or a method of using gas pressure such as nitrogen gas.

After this, when the isolation valve 5 is opened, the high-temperature and high-pressure steam in the dry well 31 flows into the filtered containment venting vessel 1 through the dry well vent pipe 7. When the isolation valve 6 is opened, the high-temperature and high-pressure steam in the wet well 32 flows into the filtered containment venting vessel 1 through the wet well vent pipe 8. The vent gas containing radioactive materials is passed through the filtered containment venting vessel 1 into which the organic iodine remover 2 and the trapping material 3 are injected.

In the filtered containment venting apparatus 600, in the filtered containment venting vessel 1, among the radioactive materials contained in the vent gas, aerosols, inorganic iodine, and the like are trapped in the scrubbing water 13 or in the condensed water obtained by condensing the vent gas. Organic iodine is dissolved in the organic iodine remover 2 and decomposed into organic components and iodide ions. Iodine ions, such as iodide ions, are trapped as metal iodides by the trapping material 3. The gas from which the radioactive materials have been sufficiently removed is released into the environment through the outlet pipe 11 and the exhaust pipe 12.

According to the above-described filtered containment venting apparatus (organic iodine trapping apparatus) 600, the organic iodine remover 2 and the trapping material 3 are injected from the storage vessel 14 into the filtered containment venting vessel 1 during the venting, and thus, the organic iodine remover 2 and the trapping material 3 stored in a stable environment can efficiently trap the organic iodine in the vent gas. Since the trapping material 3 is dispersed in the organic iodine remover 2, it is possible to quickly immobilize the iodine ions generated by the decomposition of the organic iodine. By the organic iodine remover 2 and the trapping material 3, high trapping efficiency with respect to the organic iodine can be obtained, and thus, the amount of the organic iodine remover 2 used can be suppressed. Since the trapping material 3 is contained as a dispersoid in the organic iodine remover 2, the organic iodine remover 2 and the trapping material 3 can be stored and managed in a single vessel. Since the organic iodine remover 2 or the trapping material 3 is stored separately from the scrubbing water 13, deterioration due to moisture is suppressed. In this manner, the storage vessel 14 has a structure that blocks the contact with air, and the like, and may have a size sufficient to store the required amount of the organic iodine remover 2 and trapping material 3, and thus, there is no need to add complicated or large equipment. Accordingly, according to such an apparatus, the organic iodine can be efficiently trapped while suppressing the processing cost of the organic iodine without using the complicated or large equipment. Aerosols or inorganic iodine can be efficiently trapped by the scrubbing water 13.

Seventh Embodiment

Figure 7:
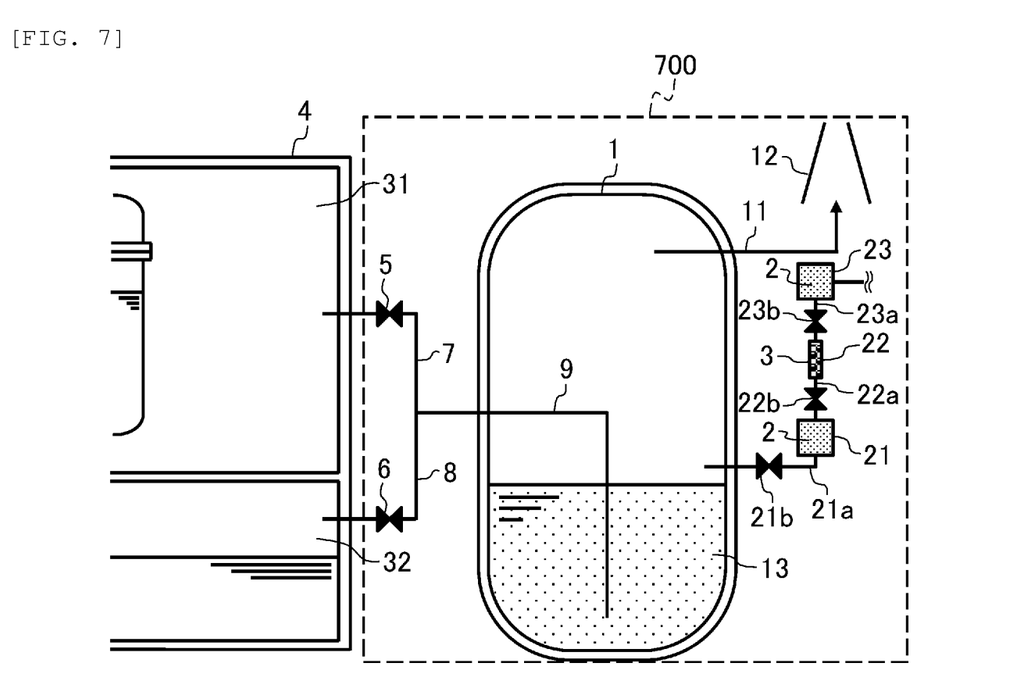
FIG. 7 is a sectional view schematically illustrating an organic iodine removing apparatus according to a seventh embodiment.

FIG. 7 is a sectional view schematically illustrating an organic iodine removing apparatus according to a seventh embodiment.

FIG. 7 illustrates an example of the application of the present invention to a filtered containment venting apparatus that traps radioactive materials released from the inside of a nuclear reactor container vessel, as an example of the organic iodine trapping apparatus that traps the organic iodine.

As illustrated in FIG. 7, similar to the above-described filtered containment venting apparatus 100, a filtered containment venting apparatus (organic iodine trapping apparatus) 700 according to the present embodiment includes the filtered containment venting vessel (trapping vessel) 1, the organic iodine remover 2, the trapping material 3, the isolation valves 5 and 6, the dry well vent pipe 7, the wet well vent pipe 8, the inlet pipe 9, the outlet pipe 11, and the exhaust pipe 12.

The filtered containment venting apparatus 700 differs from the above-described filtered containment venting apparatus 100 in that the scrubbing water 13 is stored in the filtered containment venting vessel 1, and a first storage vessel 21, a first injection pipe 21*a*, a first on-off valve 21*b*, a second storage vessel 22, a second injection pipe 22*a*, a second on-off valve 22*b*, a third storage vessel 23, a third injection pipe 23*a*, and a third on-off valve 23*b* are added.

In the filtered containment venting apparatus 700, the first storage vessel 21 containing the organic iodine remover 2 is connected to the filtered containment venting vessel 1 through the first injection pipe 21*a*. One end of the first injection pipe 21*a* is connected to the bottom of the first storage vessel 21 and the other end is connected to the filtered containment venting vessel 1. The first injection pipe 21*a* is equipped with the first on-off valve 21*b*. The first on-off valve 21*b* can open and close the pipeline from the first storage vessel 21 to the filtered containment venting vessel 1.

The second storage vessel 22 containing the trapping material 3 is connected to the first storage vessel 21 through the second injection pipe 22*a*. One end of the second injection pipe 22*a* is connected to the bottom of the second storage vessel 22 and the other end is connected to the upper part of the first storage vessel 21. The second injection pipe 22*a* is equipped with the second on-off valve 22*b*. The second on-off valve 22*b* is capable of opening and closing the pipeline from the second storage vessel 22 to the first storage vessel 21.

The third storage vessel 23 containing the organic iodine remover 2 is connected to the second storage vessel 22 through the third injection pipe 23*a*. One end of the third injection pipe 23*a* is connected to the bottom of the third storage vessel 23 and the other end is connected to the upper part of the second storage vessel 22. The third injection pipe 23*a* is equipped with the third on-off valve 23*b*. The third on-off valve 23*b* is capable of opening and closing the pipeline from the third storage vessel 23 to the second storage vessel 22.

In the filtered containment venting apparatus 700, the organic iodine remover 2 is stored in the first storage vessel 21 and the third storage vessel 23, respectively, even before the venting is performed. The trapping material 3 is stored in the second storage vessel 22 before the venting is performed. The scrubbing water 13 is stored in the filtered containment venting vessel 1 since before the venting is performed. The organic iodine remover 2 and the trapping material 3 are injected into the filtered containment venting vessel 1 to trap the organic iodine when the venting is performed, before the vent gas is passed through the filtered containment venting vessel 1. The trapping material 3 is in powder form so as to be capable of being dispersed in the organic iodine remover 2.

In the filtered containment venting apparatus 700, the same substance as that in the above-described filtered containment venting apparatus 100 can be used as the organic iodine remover 2 or the trapping material 3. However, it is preferable that the trapping material 3 is insoluble and non-reactive to the scrubbing water. According to the trapping material 3, even when coming into contact with the scrubbing water 13, the action of the trapping material 3 itself is unlikely to be deteriorated. The particle size of the trapping material 3, the amount of trapping material 3, and the specific gravity and compatibility relationship between the organic iodine remover 2 and the scrubbing water 13 can be the same as those of the above-described filtered containment venting apparatus 500.

In the filtered containment venting apparatus 700, when the venting is performed, the first on-off valve 21*b*, the second on-off valve 22*b*, and the third on-off valve 23*b* are opened before the isolation valves 5 and 6 are opened. It is preferable that these valves are opened in the order of the third on-off valve 23*b*, the second on-off valve 22*b*, and the first on-off valve 21*b*.

In this order, by the organic iodine remover 2 in the third storage vessel 23, it is possible to make the powdered trapping material 3 flow toward the filtered containment venting vessel 1. The organic iodine remover 2 in the first storage vessel 21 can prevent the trapping material 3 from settling in the scrubbing water 13. Therefore, the trapping material 3 prepared in the second storage vessel 22 can be dispersed in the organic iodine remover 2 in the filtered containment venting vessel 1 without leaving a large amount in the vessel.

After this, when the isolation valve 5 is opened, the high-temperature and high-pressure steam in the dry well 31 flows into the filtered containment venting vessel 1 through the dry well vent pipe 7. When the isolation valve 6 is opened, the high-temperature and high-pressure steam in the wet well 32 flows into the filtered containment venting vessel 1 through the wet well vent pipe 8. The vent gas containing radioactive materials is passed through the filtered containment venting vessel 1 into which the organic iodine remover 2 and the trapping material 3 are injected.

In the filtered containment venting apparatus 700, in the filtered containment venting vessel 1, among the radioactive materials contained in the vent gas, aerosols, inorganic iodine, and the like are trapped in the scrubbing water 13 or in the condensed water obtained by condensing the vent gas. Organic iodine is dissolved in the organic iodine remover 2 and decomposed into organic components and iodide ions. Iodine ions, such as iodide ions, are trapped as metal iodides by the trapping material 3. The gas from which the radioactive materials have been sufficiently removed is released into the environment through the outlet pipe 11 and the exhaust pipe 12.

According to the above-described filtered containment venting apparatus (organic iodine trapping apparatus) 700, the organic iodine remover 2 and the trapping material 3 are injected from each of the storage vessels 21, 22, and 23 into the filtered containment venting vessel 1 during the venting, and thus, the organic iodine remover 2 and the trapping material 3 stored in a stable environment can efficiently trap the organic iodine in the vent gas. Since the trapping material 3 is dispersed in the organic iodine remover 2, it is possible to quickly immobilize the iodine ions generated by the decomposition of the organic iodine. By the organic iodine remover 2 and the trapping material 3, high trapping efficiency with respect to the organic iodine can be obtained, and thus, the amount of the organic iodine remover 2 used can be suppressed. Since the organic iodine remover 2 or the trapping material 3 is stored separately from the scrubbing water 13, deterioration due to moisture is suppressed. Since the organic iodine remover 2 and the trapping material 3 are stored separately until the time of venting, deterioration due to interactions and contaminants is suppressed. In this manner, the storage vessels 21, 22, and 23 have a structure that blocks the contact with air and the like, and may have a size sufficient to store the required amount of the organic iodine remover 2 or trapping material 3, and thus, there is no need to add complicated or large equipment. Accordingly, according to such an apparatus, the organic iodine can be efficiently trapped while suppressing the processing cost of the organic iodine without using the complicated or large equipment. Aerosols or inorganic iodine can be efficiently trapped by the scrubbing water 13.

Above, the embodiments of the present invention have been described, but the present invention is not limited to the above-described embodiments, and include various modification examples without departing from the technical scope. For example, the above-described embodiments are not necessarily limited to those with all of the described configurations. It is also possible to replace some of the configurations of one embodiment with another, or to add other configurations to those of one embodiment. It is also possible to add other configurations, delete configurations, or substitute configurations for some of the configurations in some embodiments.

For example, the above-described filtered containment venting apparatuses 100 to 700 are connected to the dry well 31 and the wet well 32, but the filtered containment venting apparatus may be connected to either the dry well or the wet well. The filtered containment venting apparatus may be installed separately in each of the dry well and the wet well. The pipe system such as the vent pipe connected to the filtered containment venting apparatus can be connected to appropriate locations in the nuclear reactor container vessel.

The above-described filtered containment venting apparatuses 100 to 300 and 500 to 700 are not equipped with the filter 10 at the upper part of the filtered containment venting vessel 1, but the filter 10 may be installed at the upper part of these filtered containment venting vessels 1 in order to trap aerosols and the like. According to the filter 10, the aerosols and the like released into the gas phase can be trapped.

The above-described filtered containment venting apparatuses 200 to 400 do not have the scrubbing water 13 stored in the filtered containment venting vessel 1, but the scrubbing water 13 may be placed in these filtered containment venting vessels 1. In a case where the scrubbing water 13 and the trapping material 3 are a reactive combination, it is preferable to dispose the trapping material 3 at a position that does not come into contact with the scrubbing water 13.

Although the above-described filtered containment venting apparatuses 100 to 400 have the organic iodine remover 2 stored in advance in the filtered containment venting vessel 1, the filtered containment venting apparatuses 100 to 400 may be equipped with the storage vessel containing the organic iodine remover and the injection pipe connected from the storage vessel to the filtered containment venting vessel. The organic iodine remover 2 may be injected into these filtered containment venting vessels 1 from the storage vessels. The trapping material 3 may also be injected from the storage vessel in the same manner.

There is no restriction on the type of nuclear reactor with respect to the above-described filtered containment venting apparatuses 100 to 700. The nuclear reactor can be applied to various types of nuclear reactors such as boiling water reactor (BWR), advanced boiling water reactor (ABWR), pressurized water reactor (PWR), and the like. Ionic liquid and the like that can be used as the organic iodine remover have been commercialized for general industry. Ionic liquid and the like contaminated with radioactive materials can be treated and regenerated using, for example, the method described in JP-T-2003-507185.

In addition to the above-described filtered containment venting apparatuses 100 to 700, the organic iodine trapping apparatus according to the present invention can be applied to other off-gas devices installed in nuclear reactor facilities, storage vessels or transportation vessels of nuclear fuel substances including unused nuclear fuel or used nuclear fuel, storage vessels or transportation vessels of replaced or dismantled in-reactor structures, and the like.

REFERENCE SIGNS LIST

1: filtered containment venting vessel (trapping vessel)
2: organic iodine remover
3: trapping material
4: nuclear reactor container vessel
5: isolation valve
6: isolation valve
7: dry well vent pipe
8: wet well vent pipe
9: inlet pipe
11: outlet pipe
12: exhaust pipe
13: scrubbing water
14: storage vessel
15: injection pipe
16: on-off valve
21: first storage vessel
21*a*: first injection pipe
21*b*: first on-off valve
22: second storage vessel
22*a*: second injection pipe
22*b*: second on-off valve
23: third storage vessel
23*a*: third injection pipe
23*b*: third on-off valve
31: dry well
32: wet well
100: filtered containment venting apparatus
200: filtered containment venting apparatus
300: filtered containment venting apparatus
400: filtered containment venting apparatus
500: filtered containment venting apparatus
600: filtered containment venting apparatus
700: filtered containment venting apparatus

The invention claimed is:

1. An organic iodine trapping apparatus that traps an organic iodine, comprising:
   a trapping vessel through which gas containing an organic iodine is passed;
   an organic iodine remover that is injected into the trapping vessel and decomposes the organic iodine;
   a trapping material that is injected into the trapping vessel and traps iodine ions generated by decomposition of the organic iodine;
   a first storage vessel containing the organic iodine remover;
   a second storage vessel containing the trapping material;
   a third storage vessel containing the organic iodine remover;
   a first injection pipe that connects the first storage vessel to the trapping vessel;
   a second injection pipe that connects the first storage vessel to the second storage vessel; and
   a third injection pipe that connects the second storage vessel to the third storage vessel,
   wherein the trapping material is a metal or a metal compound.

2. The organic iodine trapping apparatus according to claim 1, wherein
   the organic iodine remover is a substance composed of cations and anions.

3. The organic iodine trapping apparatus according to claim 2, wherein the cations are a quaternary ammonium cation, a quaternary phosphonium cation, a tertiary sulfonium cation, a pyrrolidinium cation, a piperidinium cation, or a morpholinium cation, and the anions are $H_3C^-$, $H_2RC^-$, $HR_2C^-$, $R_3C^-$, $NC^-$, $RCC^-$, $RS^-$, $N_3^-$, $H_2N^-$, $HRN^-$, $R_2N^-$, $RO^-$, $RCO_2^-$, $RPO_3^-$, $RSO_3^-$, $RPO_4^-$, $R_2PO_2^-$, $R_3CO^-$, $HO^-$, $NO_2^-$, $FO_3^-$, $ClO_3^-$, $BrO_3^-$, $IO_3^-$, $FO_4^-$, $ClO_4^-$, $BrO_4^-$, $IO_4^-$, $F^-$, $Cl^-$, $Br^-$, $I^-$, $F_3^-$, $Cl_3^-$, $Br_3^-$, or $I_3^-$.

4. The organic iodine trapping apparatus according to claim 1, wherein the trapping material is a zero-valent metal composed of transition elements or a metal-oxide composed of the transition elements.

5. The organic iodine trapping apparatus according to claim 1, wherein the trapping material is a metal salt composed of transition elements.

6. The organic iodine trapping apparatus according to claim 1, wherein the trapping material is contained as a dispersoid in the organic iodine remover.

7. The organic iodine trapping apparatus according to claim 1, further comprising the trapping material contained in an inner layer of the trapping vessel.

8. The organic iodine trapping apparatus according to claim 1, further comprising the trapping material disposed as a fixed floor in the trapping vessel.

9. The organic iodine trapping apparatus according to claim 1, further comprising the trapping material contained as a part of a filter installed in a gas phase portion of the trapping vessel.

10. The organic iodine trapping apparatus according to claim 1, wherein scrubbing water is retained inside the trapping vessel.

11. The organic iodine trapping apparatus according to claim 1, wherein a particle size of the trapping material is equal to or less than 300 nm.

12. The organic iodine trapping apparatus according to claim 1, wherein an amount of the trapping material is 0.1% by mass or more and 10% by mass or less with respect to 100% by mass of the organic iodine remover.

* * * * *